United States Patent
Jang et al.

(10) Patent No.: US 7,457,321 B2
(45) Date of Patent: Nov. 25, 2008

(54) METHOD FOR REQUESTING AND GRANTING A SHORTER SLOT CYCLE IN A WIRELESS NETWORK

(75) Inventors: Ke-Chi Jang, Plano, TX (US); Chung-Ching Wang, Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 664 days.

(21) Appl. No.: 10/877,108

(22) Filed: Jun. 25, 2004

(65) Prior Publication Data

US 2005/0007973 A1    Jan. 13, 2005

Related U.S. Application Data

(60) Provisional application No. 60/486,725, filed on Jul. 11, 2003.

(51) Int. Cl.
*H04J 3/06* (2006.01)
(52) U.S. Cl. .............. 370/503; 370/311; 370/350; 455/515; 455/434; 455/574
(58) Field of Classification Search .............. 370/311, 370/348, 342, 319, 503, 350; 455/515–517, 455/574, 434, 343.4
See application file for complete search history.

(56) References Cited

U.S. PATENT DOCUMENTS

| 5,627,883 | A | 5/1997 | Maeda et al. |
| 6,138,032 | A | 10/2000 | Hill et al. |
| 6,334,062 | B1 | 12/2001 | Cashman |
| 2002/0106997 | A1 | 8/2002 | Barber et al. |

(Continued)

FOREIGN PATENT DOCUMENTS

EP    0 784 387 A2    7/1997

(Continued)

OTHER PUBLICATIONS

Chauhan, Rahul; "What does the mobile do when its Idle?"; CDMA Home, Aug. 21, 2001.

(Continued)

*Primary Examiner*—Vincent P. Harper
*Assistant Examiner*—Dung Lam
(74) *Attorney, Agent, or Firm*—Hemingway & Hansen; D. Scott Hemingway

(57) ABSTRACT

The present invention supports a message protocol on a wireless communication network to setup a shortened slot cycle operation for a mobile station. During wireless, packet-based communication, a mobile station can utilize a shortened slot cycle to increase the frequency a communication channel is monitored by a mobile station while in idle state. While this is advantageous to communication requiring a fast response, it increases power consumption and decreases battery charge time. Under present usage, the shortened slot cycle must be used by all mobile stations connected to the base transceiver whether required or not.

To increase efficiency and avoid unnecessary power consumption, the invention allows only those mobile stations that require it to implement the shortened slot cycle. Signaling messages sent from the mobile station to the base station controller will initiate a shortened slot cycle only for that mobile station. Other mobile stations connected to the base transceiver operate without implementing the shortened slot cycle.

20 Claims, 3 Drawing Sheets

U.S. PATENT DOCUMENTS

| | | | |
|---|---|---|---|
| 2002/0132602 A1 | 9/2002 | Lindskog et al. | |
| 2003/0008657 A1 | 1/2003 | Rosen et al. | |
| 2003/0190888 A1* | 10/2003 | Mangal et al. | 455/3.05 |
| 2004/0160942 A1* | 8/2004 | Kelley et al. | 370/350 |

FOREIGN PATENT DOCUMENTS

| | | |
|---|---|---|
| WO | WO 03/058992 A1 | 7/2003 |

OTHER PUBLICATIONS

"Digital cellular telecommunications system (Phase2+); Universal Mobile Telecommunications System (UMTS); Organisation of subscriber data," ETSI TS 123.008 (Jun. 2002).

"TR 45: Wireless IP Network Standard", Jun. 2000.

Perkins, C. (ed); "RFC 2002: IP Mobility Support"; Network Working Group (Oct. 1996).

Perkins, C. and P. Calhoun; "RFC 3012: Mobile IPv4 Challenge/Response Extensions"; Network Working Group (Nov. 2000).

Deering, S (ed); "RFC 1256: ICMP Router Discovery Messages"; Network Working Group (Sep. 1991).

Perkins, C. (ed); "RFC 3344: IP Mobility Support for IPv4"; Network Working Group (Aug. 2002).

Glass, S, T. HIller, S. Jacobs, and C. Perkins; "RFC 2977: Mobile IP Authentication, Authorization, and Accounting Requirements"; Network Working Group (Oct. 2000).

"TIA/EIA Interim Standard: Upper Layer (Layer 3) Signaling Standard for cdma2000 Spread Spectrum Systems; Release C", Telecommunications Industry Association (May 2002).

"Introduction to CDMA2000"; RADCOM, Ltd. (Aug. 2003).

Gogic, Alex (ed); "Fast Call set-up"; 3GPP2 (Apr. 15, 2002).

"3rd Generation Partnership Project; Technical Specification Group Services and System Aspects; General Packet Radio Service (GPRS); Service Description; Stage 2"; 3GPP (1999).

Perkins, C. (ed); "RFC 3220: IP Mobility Support for IPv4"; Network Working Group (Jan. 2002).

* cited by examiner

METHOD FOR REQUESTING AND GRANTING A SHORTER SLOT CYCLE IN A WIRELESS NETWORK

RELATED APPLICATION DATA

This application is related to Provisional Patent Application Ser. No. 60/486,725 filed on Jul. 11, 2003, and priority is claimed for this earlier filing under 35 U.S.C. § 120. The Provisional Patent Application is also incorporated by reference into this patent application.

TECHNICAL FIELD OF THE INVENTION

A protocol for shortening the time slot cycle for a wireless network by a mobile station using slot mode.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

In a typical Internet-based communication scenario, data is transmitted from an originating communication device on a first network across a transmission medium to a destination communication device on a second network. After receipt at the second network, the packet is routed through the network to a destination communication device using standard addressing and routing protocols. Because of the standard protocols in Internet communications, the IP protocol on the destination communication device decodes the transmitted information into the original information transmitted by the originating device.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks.

Packet-Based Communication Systems

In Internet Protocol (IP) networks, the communication process is very different from prior conventional telecommunication systems. In an IP network communication, there is no open switched connection established between the caller and recipient devices. The information being transmitted between the caller and recipient devices is broken into packets of data, and each packet of data is transmitted to the recipient device in pieces. The data packets individually contain routing information to direct each packet to the recipient device. These packets are then reassembled into a coherent stream of data at the recipient device.

The $3^{rd}$ Generation Partnership Project 2 (3GPP2), also referred to as CDMA2000, is an evolving third generation communication system standard for wireless communication systems transmitting multimedia services using the packet-based Internet protocol. These 3GPP2 mobile communication systems support multimedia telecommunication services delivering voice (VoIP) and data, to include pictures, video communications, and other multimedia information over mobile wireless connections. These systems generally operate over a derivative General Packet Radio Service (GPRS) and/or Universal Mobile Telecommunication Systems (UMTS) communication system architecture.

During operation, the Mobile Station (MS) can enter an Idle state. That is, the MS alternates between active mode (MS in Traffic Channel state) and dormant mode (MS in Idle state) to save battery power because the packet data applications communicate in a bursty fashion. While in Idle state, the MS monitors a forward link common channel to update configuration related parameters and to receive page or other common channel messages. When in Idle state, the MS can reduce its power consumption by using a slotted mode of operation. In slotted mode, the MS only receives message in pre-determined time slots, so the MS only "wakes up" at these pre-determined times, or time slots, to receive messages on the forward link channel. So the MS usually stops monitoring the forward link common channel when it is not in the pre-determined time slots to save battery power and periodically starts monitoring according to the assigned time slots to receive forward link common channel signaling messages.

Packet data applications may require the MS to monitor the communication channels more frequently while in Idle state, compared to other communication applications, to allow the MS to switch from Idle state to Traffic Channel state faster. When in the Idle state, there is no traffic channel where data packets are transmitted over a communication link in a communication session. When the MS detects a signaling message for an incoming communication, it can exit the Idle state and enter a Traffic state setting up a traffic channel and switching into an active mode for communication very fast.

The existing time slot allocations can result in excessive latency and delay for specific services, so a shorter slot cycle can be specified to "wake up" the MS to monitor communication channels more frequently and permit switching the MS from Idle state quicker. This shortened Slot Cycle Index (SCI) feature is very useful for time sensitive types of application. Under prior art practice, this slot cycle operates on a multiple of 1.28 second cycles to provide integer multiples of sixteen 80 millisecond slots. The base station controller connected to the MS is the system component that determines whether this shortened slot cycle operation will be utilized for the connected MS, and all of the connected MS will have to use this specified slot cycle. The shortened time slot cycle permits the MS to receive page messages faster and achieve faster call connections. However, the shorter slot cycle results in greater power consumption and shorter operating time on a battery charge.

Not all service options (e.g. call types) require the shorter slot cycle feature. However, under the current method of the base transceiver specifying the shorter slot cycle, all connected network MSs with shortened slot cycle capability must use the shorter slot cycle when the SCI feature is activated at the transceiver. A need exist for a more efficient way to implement the SCI feature setting up the shortened time slot cycle such that only those applications requiring a faster MS response implement the shortened slot cycle.

SUMMARY OF THE INVENTION

When the MS initiates a call or is being paged by the Base Station (BS), the call type is specified to the MS. At call setup time, the MS activates the SCI feature, if required, using a signaling message, such as an origination message or a response message on the common channel or a service connect completion message on the traffic channel, to specify the parameters of the shorter SCI feature. The message content sent from the MS contains the length of the SCI and the duration of the proposed SCI value. Before the call is released, the BS uses a signaling message, such as a release order message, to grant or not grant the MS request. If the BS grants the MS request, the MS starts using the shortened SCI when it returns to Idle state for the specified duration. For MS terminated calls, the MS may send a response message before it goes onto the traffic channel to request a SCI. The MS may go to the traffic channel directly by attaching the request for a SCI to a signaling message to initiate the SCI feature. While the MS is in Idle state, the MS may use a signaling message, such as an origination message on common channel, to request SCI feature without a call setup. The BS uses a signaling message, such as a release order message, to grant or not grant the MS request.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
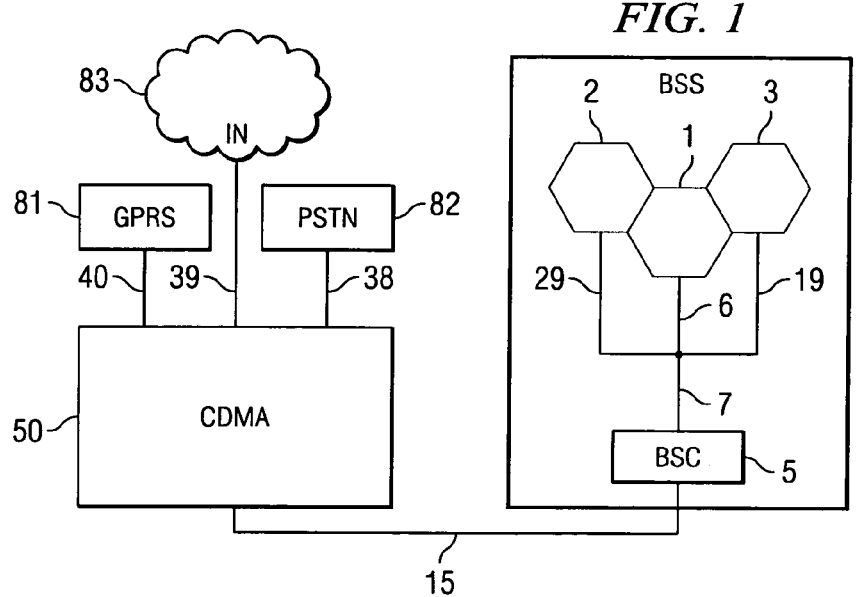
FIG. 1 is a schematic diagram of the functional elements of a wireless communication network utilizing the invention based on a GPRS derivative implementing architecture for a 3GPP2/CDMA2000 system.

A typical cellular communication system is comprised of multiple cell sites operating over a geographic region. Referring to FIG. 1, cell site 1 supports wireless communication with mobile stations (e.g. cellular phones, laptop computers, palm pilot devices, etc.) within that cell site service area. Other cell sites 2 and 3 are located next to cell site 1 on FIG. 1, and each cell site 2 and 3 supports wireless communications in their respective areas.

The Base Station Controller ("BSC") 5 is coupled to the cellular site 1 by signal lines 6 and 7. The BSC 5 is coupled to cellular site 3 via signal line 19 and 7, and the BSC 5 is coupled to cellular site 2 via signal line 29 and 7. The BSC 5 supports the transmission of voice and data communications on the cellular wireless network, and the BSC 5 allows for the continuity of transmissions to and from mobile stations as each mobile station roams the wireless network from one cellular site to another (e.g. cell site 1 to cell site 2). The BSC 5 will also control other components in the cellular sites to further support the transmission of voice and data on the wireless network. Collectively, the BSC 5 and its associated components can be called a Base Station Subsystem ("BSS") network 70. The BSC 5 can also be individually referred to as the BSS.

CDMA2000 network 50 is shown in FIG. 1. Although other implementing architectures for the CDMA2000 configuration may be used, in the preferred embodiment the CDMA2000 network 50 is based on the GPRS architecture. The BSC 5 unit is coupled to CDMA2000 system 50 through interface signal line 15. The CDMA2000 system 50 supports the transmission of IP packets, and other types of packeted data, over a communication infrastructure. The CDMA2000 50 provides packet-based access to a mobile node on the wireless network 70 through the communication link 15.

The CDMA2000 50 is also coupled to other types of networks, such as GPRS 81, a Public Switched Telephone Network (PSTN) 82, and the Internet 83. The CDMA2000 50 is coupled to the GPRS 81 via communication link 40. The CDMA2000 50 is coupled to the PSTN 82 via communication link 38, and the CDMA2000 50 is coupled to the Internet 83 via communication link 39.

A base transceiver station on cellular site 1 supports a wireless communication from a subscriber, mobile unit user, or a mobile station in the cell site 1 service area. In this manner, a mobile station operating on the cellular site 1 of BSS 70 can communicate on the Internet 83 or the PSTN 82, for example, through the communication link 15 and the CDMA2000 50.

Figure 2:
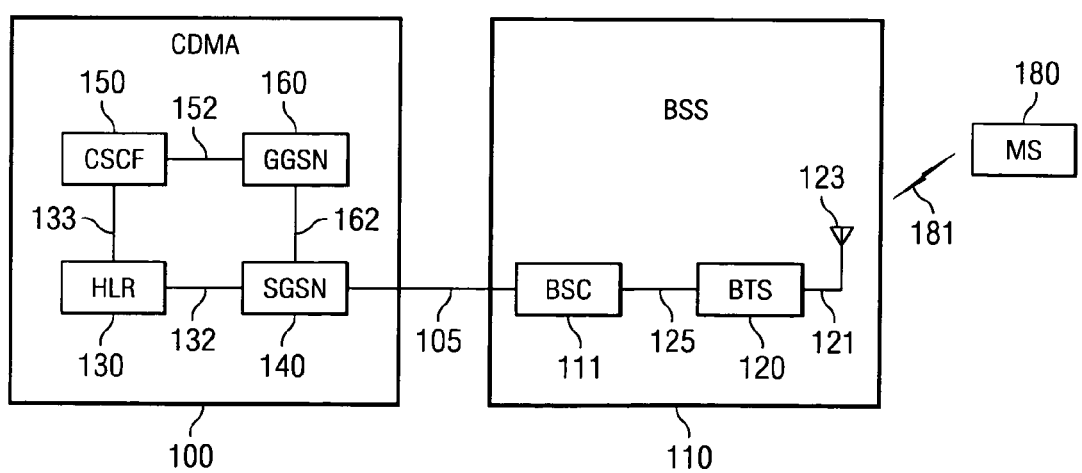
FIG. 2 shows a GPRS derivative implementing architecture for a 3GPP2/CDMA2000 communication system using the invention.

FIG. 2 shows more internal details of the CDMA2000 wireless telecommunications network 100 coupled to a BSS 110 via communication link 105. The communication link 105 is coupled to the BSS 110 through its associated BSC 111. The BSC 111 is in turn coupled to a Base Transceiver Subsystem (BTS) 120, supporting wireless communications on a cellular site. The BSC 111 is coupled to the BTS 120 via communication line 125. The BTS 120 is coupled to an antenna 123 via communication line 121. The antenna supports wireless communications with the mobile station 180 via the wireless communication link 181.

The CDMA2000 network 100 comprises a Home Location Register (HLR) 130 coupled to the Serving GPRS Support Node (SGSN) 140 via signal line 132. The GPRS 100 also comprises a Call State Control Function (CSCF) 150 coupled to a Gateway GPRS Support Node (GGSN) 160 via signal line 152. The GGSN 160 is coupled to a SGSN 140 via signal line 162, and the CSCF 150 is coupled to the HLR 130 via signal line 133.

The data transmission between the SGSN 140 and BSC 111 flows through communication link 105 thereby permitting communication between the BSS 110 and the CDMA2000. CDMA2000 is also coupled to other networks (not shown), such as a PSTN, the Internet, or a GPRS, as described in FIG. 1.

The MS 180 has several different states. This includes the Initialization State, Idle State, System Access State, and Traffic State. While in these different states, the MS will receive or transmit different messages, such as Acknowledgments, Registration, Idle Handoff, Paging Channel, System Parameters Messages, Access Parameters Message, Neighbor List Message, CDMA Channel List Message, and Mobile Station Order Message.

While in Idle State, the MS 180 monitors the paging channel. If a message is received on the paging channel requiring action by the MS 180, the MS 180 enters System Access State or Traffic State. While in Idle State, the MS 180 can receive messages, receive an incoming call, initiate a call, initiate a registration, or initiate a message transmission. To conserve battery power, typically while in Idle State the MS 180 operates in a slotted mode of operation. That is, the MS 180 constantly turns itself on and off according to an established time slot cycle to start and stop monitoring the forward link common channel and to receive page or other common channel messages, to receive an incoming call or message, or to perform other actions. The BSC 111 controls the slot cycle period that determines the time slots when the MS 180 will awake, or switch on, to start monitoring communications channels and receive transmissions from the BTS 120 transmitting to the MS 180.

Figure 3:
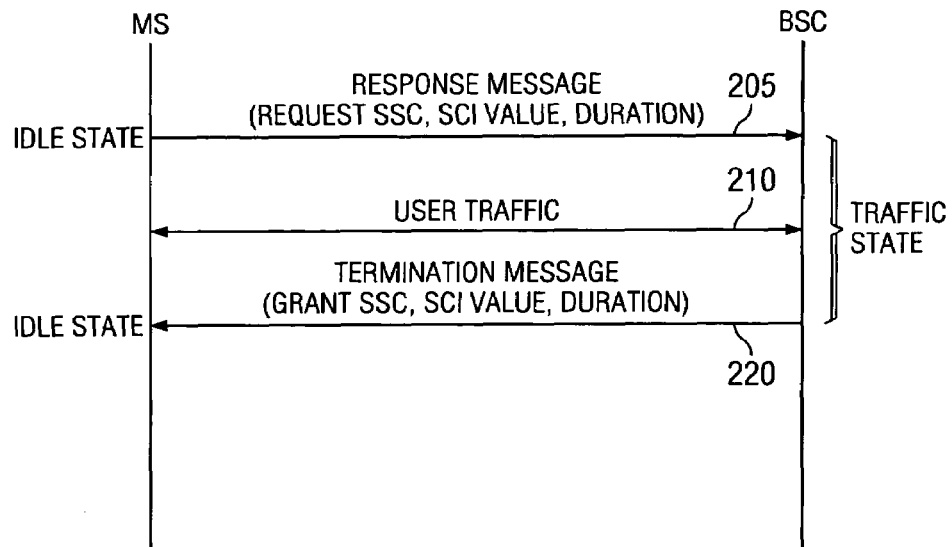
FIG. 3 is a diagram of the signaling message flow between the mobile station and the base station controller where the mobile station responds to a request message to request a shortened slot cycle on the common channel or traffic channel prior to a communication session.

FIG. 3 shows the implementation of the invention where the MS responds to a request message to request a shortened slot cycle on the common channel or traffic channel prior to a communication session. The MS transmits a response message at step 205 that contains a request for a shortened slot cycle (SSC) on the common channel or traffic channel. The response message contains one or more data fields with a SCI value and a duration value for the length of time to maintain the SSC. Standard message transmissions to the BSC from the MS can make this request under the CDMA 2000 standards include the Origination Message, Page Response Message, and Service Connect Completion Message formats or other signaling messages. Other response signaling messages may also be used in other information packet transmission standards.

In step 210, a communication session has been initiated and user traffic is communicated on a traffic channel between the BSC and the MS, such as a phone call, until the communication is terminated and resources released. During this period of time, the MS in an active traffic state communicating over a traffic channel with the BSC. At step 220, the completed communication session is terminated by a termination message or signal. The termination message grants the SSC request and contains one or more data fields with a SCI value and a duration value for the length of time the SSC will be maintained. In the CMDA 2000 standards, the termination message includes a Release Order or other similar messages. After receipt, the MS enters Idle state and awakens to monitor communication according to the granted SCI value and specified shortened slot cycle.

Figure 4:
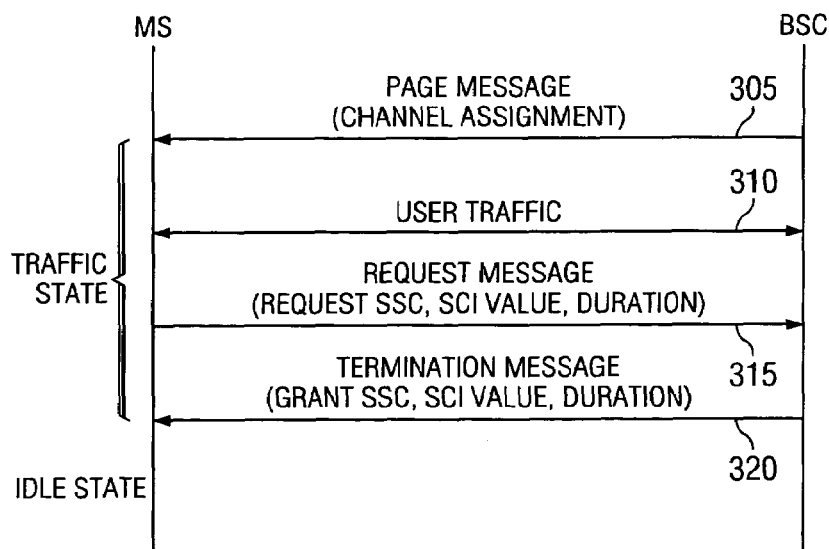
FIG. 4 is a diagram of the signaling message flow between the mobile station and the base station controller where the mobile station request a shortened slot cycle on the traffic channel during a communication session.

FIG. 4 shows the implementation of the invention where the MS request a shortened slot cycle on the traffic channel during a communication session. At step 305, the BSC transmits a page message to initiate a communication with the MS containing a channel assignment. At step 310, the communication session is in progress with information packets being transmitted on the traffic channel between the MS and the BSC. While the communication session is in progress, at step 315 the MS transmits a request message to the BSC on the traffic channel that contains a request for a shortened slot cycle (SSC). The request message contains one or more data fields with a SCI value and a duration value for the length of time to maintain the SSC. A standard signaling message to the BSC from the MS that can make this request under the CDMA 2000 standards include any of the Reverse Link Dedicated Signaling Channel messages. Other signaling messages may also be used in other information packet transmission standards.

In step 320, the communication session is terminated and user traffic ceases on the traffic channel between the BSC and the MS. To terminate the communication and release resources, a termination message is transmitted from the BSC to the MS. The termination message includes the granting of the SSC and contains one or more data fields with a SCI value and a duration value for the length of time the SSC will be maintained. The MS changes from the Traffic State to Idle State and awakens according to the granted SCI value and specified shortened slot cycle. The termination message under the CMDA 2000 standards includes the Release Order. Other termination signaling messages may be used in other information packet transmission standards.

Figure 5:
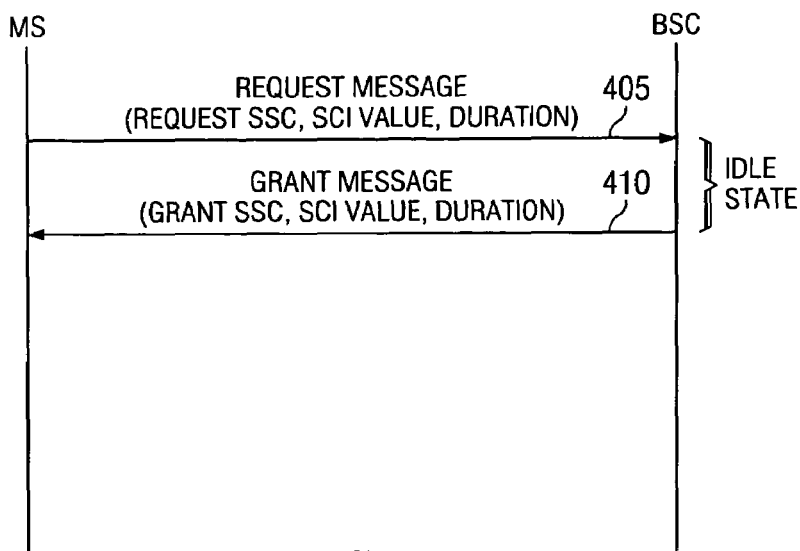
FIG. 5 is a diagram of the signaling message flow between the mobile station and the base station controller where the mobile station requests a shortened slot cycle on the common channel prior to or after a communication session in a signaling message while in Idle State.

FIG. 5 shows the implementation of the invention where the MS requests a shortened slot cycle on the common channel prior to or after a communication session in a signaling message while in Idle State. At step 405, the MS transmits a request message to the BSC on the common channel that contains a request for a shortened slot cycle (SSC). The request message contains one or more data fields with a SCI value and a duration value for the length of time to maintain the SSC. A standard signaling message transmission to the BSC from the MS that can make this request under the CDMA 2000 standards includes a Fast Call Setup message. Other signaling messages may also be used in other information packet transmission standards. In step 410, the BSC transmits a grant message to the MS. The grant message contains one or more data fields with a SCI value and a duration value for the length of time the SSC will be maintained. The grant message under the CMDA 2000 standards can include a Release Order. Other granting signaling messages may be used in other information packet transmission standards.

Figure 6:
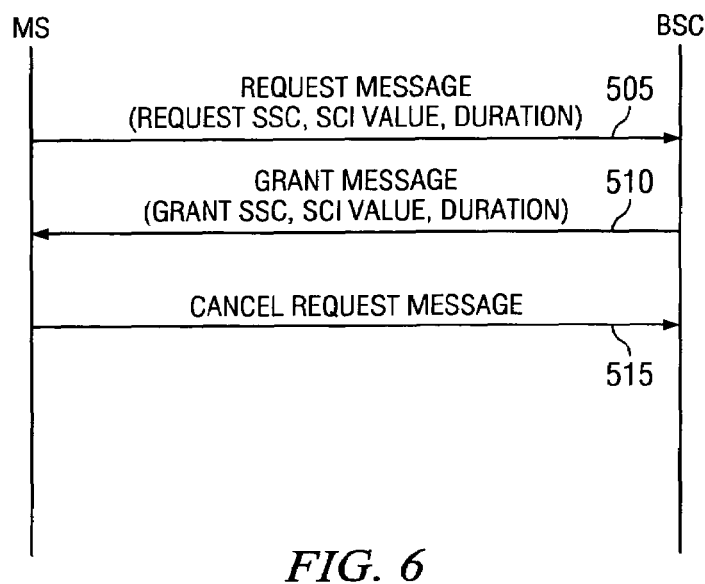
FIG. 6 is a diagram of the signaling message flow between the mobile station and the base station controller where the MS cancels a request for a shortened slot cycle.

FIG. 6 shows an embodiment of the invention where the MS cancels a request for a shortened slot cycle. At step 505, the MS transmits a request message to the BSC on the common channel that contains a request for a SSC. The request message contains one or more data fields with a SCI value and a duration value for the length of time to maintain the SSC. In step 510, the BSC transmits a grant message to the MS. The grant message contains one or more data fields with a SCI value and a duration value for the length of time the SSC will be maintained. In step 515, the MS transmits a cancel message to the BSC to cancel the request for the SSC. Under the CMDA 2000 standard, the cancellation can be done using a Release Order message. The cancellation will prevent the MS from enabling the SSC mode of operation so the MS continues using either the conventional slot cycle or dispenses with slot cycle mode of operation entirely.

While the invention has been particularly shown and described with respect to preferred embodiments, it will be readily understood that minor changes in the details of the invention may be made without departing from the spirit of the invention.

Having described the invention, we claim:

1. A packet-based wireless communication system, comprising:
   a base station controller coupled to a base station and linked by a wireless communication link to a plurality of mobile stations;
   the base station controller including a processor that receives a shortened cycle signaling message from one of said plurality of mobile stations during the exchange of communication traffic or in an idle state wherein said message contains a data field for a requested shortened cycle, said data field including a slot cycle index value;
   the base station controller creating a signaling message containing a data field for a granted shortened cycle that is transmitted to the mobile station during the exchange of communication traffic or in an idle state of use, said data field including a slot cycle index value;
   the base station controller creating a termination message when the shortened cycle will no longer be supported and said base station controller receiving a cancellation message when mobile node wishes to cancel a shortened cycle request before the shortened cycle operation is initiated; and
   a wireless communication channel used by the base station monitored according to a start monitoring state set using the granted shortened slot cycle.

2. The packet-based wireless communication system of claim 1 wherein the signaling message containing the request further comprises a data field identifying a duration time the mobile station operates the shortened slot cycle.

3. The packet-based wireless communication system of claim 1 wherein the signaling message containing the grant further comprises a data field identifying a duration time the mobile station operates the shortened slot cycle.

4. The packet-based wireless communication system of claim 1 wherein the signaling message containing the request comprises one of the following:
   an origination signaling message,
   a page response signaling message,
   a service connect completion signaling message, or
   a reverse link dedicated signaling channel message.

5. The packet-based wireless communication system of claim 1 wherein the signaling message containing the request comprises a call setup message.

6. The packet-based wireless communication system of claim 1 wherein the signaling message containing the grant comprises a release order message.

7. A method for setting the slot cycle for a mobile station to monitor a communication link comprising the steps of:
   receiving a signaling message at a base station controller containing a data field with a slot cycle index value for a requested slot cycle, said signaling message being transmitted during the exchange of communication traffic or during an idle state;
   processing the received signaling message to set a slot cycle for the mobile station;
   transmitting a signaling message from the base station controller to the mobile station containing a data field with a slot cycle index value for a granted slot cycle;
   receiving at the base station controller a cancellation message from the mobile station for canceling a shortened cycle request before the shortened cycle operation is initiated;
   switching the mobile station from a stop monitoring to a start monitoring state using the granted slot cycle, and said slot cycle being set using signaling messages unless a cancellation message is received and processed by the base station controller.

8. The method for setting the slot cycle for a mobile station to monitor a communication link of claim 7 wherein the message containing the data field for a granted slot cycle comprises a release order signaling channel message.

9. The method for setting the slot cycle for a mobile station to monitor a communication link of claim 7 wherein the message containing the data field for a requested slot cycle comprises one of the following:
   an origination signaling channel message,
   a page response signaling channel message,
   a service connect completion signaling channel message, or
   a reverse link dedicated signaling channel message.

10. The method for setting the slot cycle for a mobile station to monitor a communication link of claim 7 further comprising the step of transmitting a termination message when the shortened cycle will no longer be supported.

11. The method for setting the slot cycle for a mobile station to monitor a communication link of claim 7 further comprising the step of transmitting the message containing the data field for a requested slot cycle while the mobile station is in traffic state.

12. The method for setting the slot cycle for a mobile station to monitor a communication link of claim 7 further comprising the step of canceling the slot cycle using a message generated by the mobile station.

13. The method for setting the slot cycle for a mobile station to monitor a communication link of claim 12 wherein the message generated by the mobile station comprises a release order signaling message.

14. The method for setting the slot cycle for a mobile station to monitor a communication link of claim 7 wherein the slot cycle time period is less than 1.28 seconds.

15. The method for setting the slot cycle for a mobile station to monitor a communication link of claim 7 further comprising the steps of:
   transmitting a signaling message to a base station controller containing a data field for the duration time of a slot cycle;

transmitting a signaling message granting the shortened slot cycle from the base station controller to the mobile station with a data field for the duration time of a granted slot cycle; and ceasing using the granted slot cycle at the expiration of the duration time.

16. A method of packet-based wireless communication comprising the steps of:

transmitting a request by a mobile station for a shortened slot cycle using a signaling message containing a slot cycle index value, said request being transmitted during an idle state or while the mobile node is exchanging communication traffic;

receiving by the mobile station an authorization to utilize a shortened slot cycle in a signaling message containing a slot cycle index value and a duration value;

operating the mobile station during an idle state to periodically start and stop monitoring a communication channel using the shortened slot cycle, said slot cycle being established using only the two signaling messages;

transmitting from said mobile node a cancellation message for canceling a shortened cycle request before the shortened cycle operation is initiated.

17. A method for setting the slot cycle for a mobile station to monitor a communication link comprising the steps of:

receiving a signaling message at a base station controller containing a data field with a slot cycle index value for a requested slot cycle during an idle state or when the base station controller is exchanging message traffic;

processing the received signaling message to set a slot cycle for the mobile station;

transmitting a signaling message from the base station controller to the mobile station containing a data field with a slot cycle index value for a granted slot cycle to cause the mobile station to switch from a stop monitoring to a start monitoring state using the granted slot cycle, and the authorization to use said slot cycle having the signaling messages;

creating a termination message when the shortened cycle will no longer be supported; and receiving at the base station controller a cancellation message for canceling a shortened cycle request before the shortened cycle operation is initiated.

18. The method for setting the slot cycle for a mobile station to monitor a communication link of claim 17 wherein the message containing the data field for a granted slot cycle comprises a release order signaling channel message.

19. The method for setting the slot cycle for a mobile station to monitor a communication link of claim 17 wherein the message containing the data field for a requested slot cycle comprises one of the following:

an origination signaling channel message, a page response signaling channel message, a service connect completion signaling channel message, or a reverse link dedicated signaling channel message.

20. A packet-based wireless communication system, comprising:

a mobile station operating on a wireless communication link to a base station controller;

the mobile station transmitting a signaling message containing a data field for a requested shortened slot cycle to the base station controller during an idle state or while the mobile station is exchanging communication traffic, said data field including a slot cycle index value;

the mobile station receiving from the base station controller a signaling message containing a data field for a granted shortened slot cycle transmitted to the mobile station to use, said data field including a slot cycle index value; and the mobile station monitoring a wireless communication channel used by the base station according to a start monitoring state set using the granted shortened slot cycle, said shortened slot cycle being set using only the two signaling messages and specified using the slot cycle index value the mobile node receiving a termination message when the shortened cycle will no longer be supported; and the mobile node transmitting to said base station controller a cancellation message for canceling a shortened cycle request before the shortened cycle operation is initiated.

* * * * *